Oct. 21, 1941.   Q. LANDIS   2,259,525
VISCOSIMETRIC APPARATUS
Filed Sept. 22, 1938   2 Sheets-Sheet 1

INVENTOR
Quick Landis
BY
Nelson, Bristol, Johnson & Leavenworth
ATTORNEYS

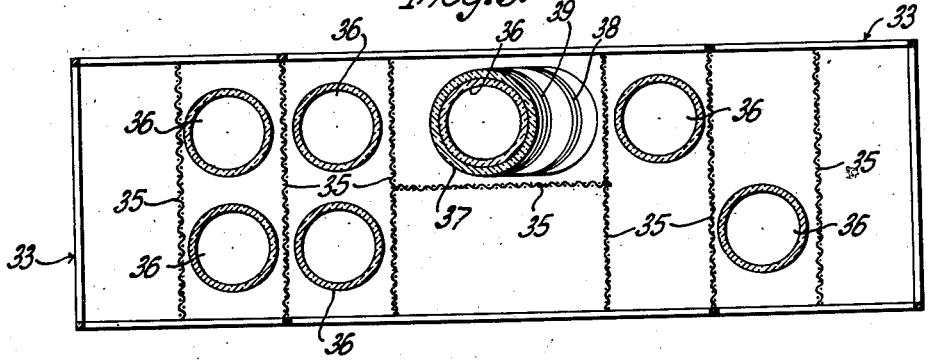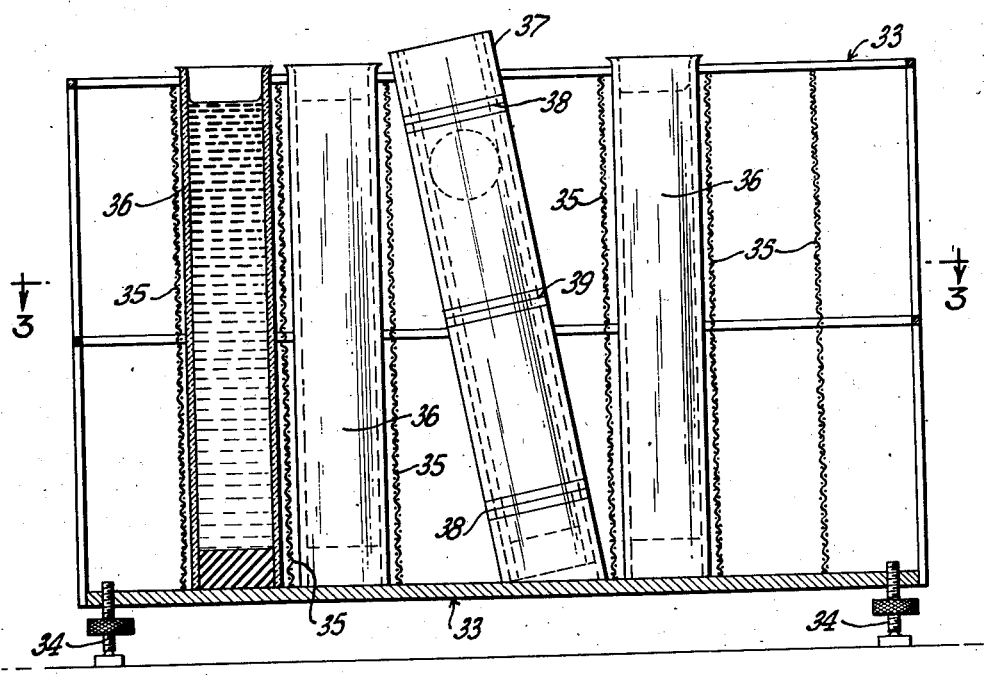

Patented Oct. 21, 1941

2,259,525

UNITED STATES PATENT OFFICE 2,259,525

VISCOSIMETRIC APPARATUS

Quick Landis, Bronx, N. Y., assignor to Standard Brands Incorporated, New York, N. Y., a corporation of Delaware Application September 22, 1938, Serial No. 231,175

3 Claims. (Cl. 265—11)

This invention relates to apparatus adapted for conditioning and measuring materials to determine their viscosities and, more particularly, to a viscosimeter of the falling sphere or ball type together with an ultra-thermostat.

The most satisfactory type of viscosimeter which avoids shearing of the solution before testing is the "falling ball" type, wherein a sphere or ball of material of specific gravity greater or less than the solution is allowed to fall, or rise respectively, in a carefully made tube of uniform inside diameter which is slightly greater than the diameter of the sphere. Two marks are generally provided in the tube, and from the time of fall (or rise) of the ball between these two marks the viscosity is calculated. The etching of these marks on the tube is a precision operation and increases the cost. Where many samples are to be run consecutively or where the sample must remain undisturbed in the tube for some time prior to testing the capacity of the conventional viscosimeter is seriously limited and the cost of a number of etched viscosimeter tubes is prohibitive.

Briefly, the present invention comprises a number of viscosity tubes of uniform inside diameter, but of only casually matched outside diameter. Another element, for example a tube, which need not be of uniform bore, large enough in inside diameter to allow the viscosity tubes to be slipped inside it or adjacent thereto, may be graduated or etched according to conventional procedure. In testing, the viscosity tubes are filled with a solution to be tested and successively placed in the larger etched tube, the readings then being taken according to the timed fall of a body between the calibrations on the larger tube. Conventional viscosimeters are jacketed and the temperature controlled by pumping water from a thermostat through the jacket. However, I have found that under these conditions the temperature in the jacket varies with room temperature. Hence the whole viscosimeter should be immersed in an ultra-thermostat cooperatively associated therewith as in the present invention.

A general object of the invention is to provide such an apparatus which is economical of manufacture, simple in construction and requires a minimum of technique for its operation.

More especially, it is an object of the invention to provide a viscosimeter of the falling sphere type having a calibrated master tube adapted successively to receive a plurality of matched viscosity tubes and thereby rapidly to determine the viscosity of a material therein under conditions of temperature maintained substantially constant by means of an ultra-thermostat cooperating therewith.

Additional objects of the invention are to provide a viscosimeter of greatly improved capacity capable of rapid routine multiple testing and which is of distinctive accuracy; in which the viscosity tubes may be removed and cleaned with great facility; in which the same calibrations on the master tube may be used with every viscosity tube, thereby minimizing error in calibration between tubes where it is sought to have them similarly calibrated; and in which many samples may be run consecutively and where the sample must remain undisturbed for a period of time prior to testing.

A further object of the invention is to provide an ultra-thermostat capable of maintaining a substantially constant thermal equilibrium, and which is adapted immersibly to receive a viscosimeter and condition the contents thereof prior to and during viscosity determinations.

Other objects of the invention will in part be obvious and will in part appear hereinafter.

The invention accordingly comprises the features of construction, combination of elements, and arrangement of parts, which will be exemplified in the construction hereinafter set forth and the scope of which invention will be indicated in the claims.

For a fuller understanding of the nature and objects of the invention reference should be had to the following detailed description taken in connection with the accompanying drawings, in which:

Fig. 2 is a side elevational view of a viscosimeter illustrating the position of the calibrated master tube and a number of viscosity tubes; and Fig. 3 is a cross-sectional view of Fig. 2 along the line 3—3 and looking in the direction of the arrows.

Figure 1:
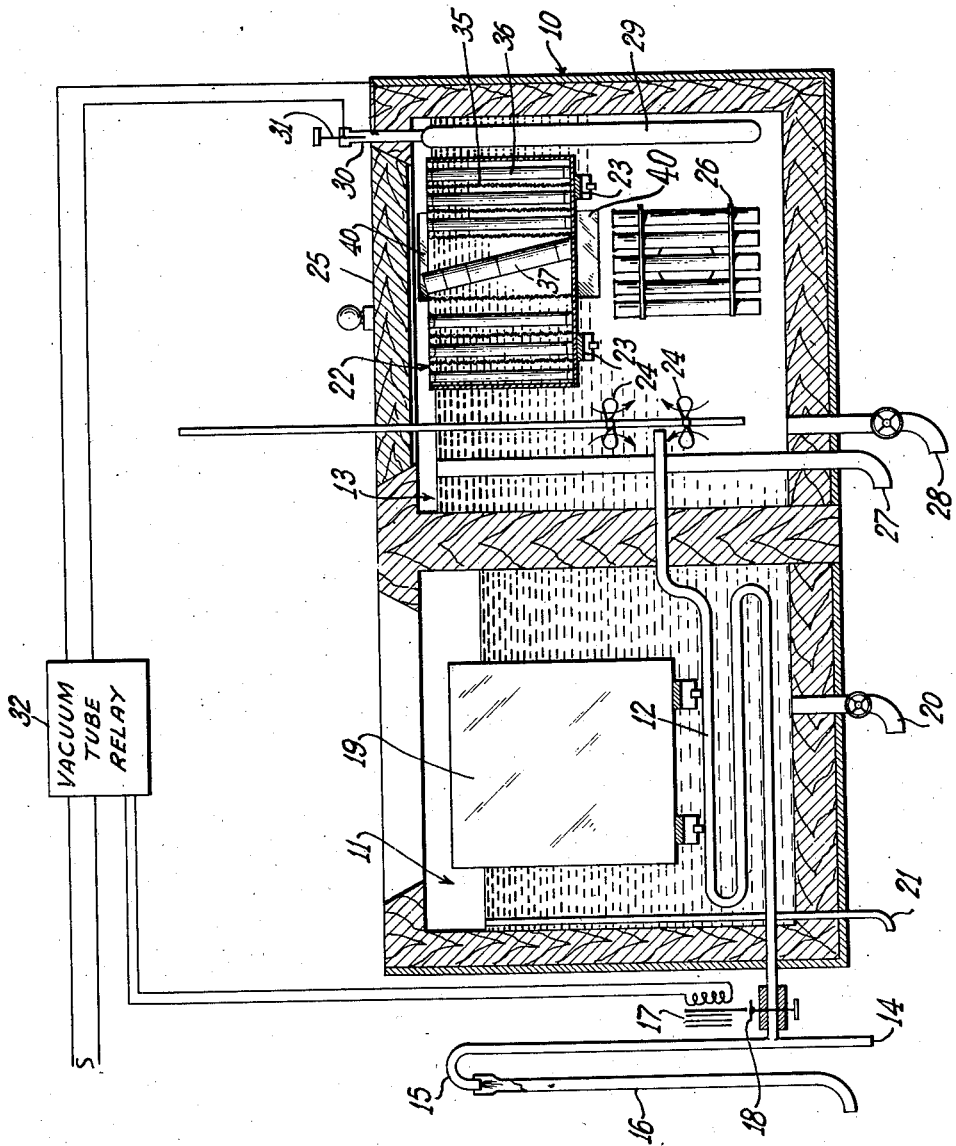
Fig. 1 represents, partly in section, a preferred form illustrating an ultra-thermostat and a viscosimeter immersed therein.

Referring more particularly to Fig. 1 of the drawings, there is shown a tank or receptacle 10 preferably lined with balsa wood insulation. This tank is divided into two compartments, one of which 11 contains one or more sections of a pipe line 12 located in a convenient manner. One end of the pipe line communicates with the outside of the tank and the other end with a second compartment 13. Passing through this pipe line is a cooling or heating medium, preferably, as in the present invention cold (or hot) water which may conveniently be connected to a tap water supply line 14 and which has a by-pass pipe 15 directed to a waste drain 16. The quantity of the cooling or heating medium (which may be any suitably desired medium) is restricted by a solenoid 17 and a valve 18, the operation of which will be more fully described hereinafter. Where tap water is used, for example, an ice chamber 19 in the compartment 11 may be utilized to attain a lower temperature, and the compartment may conveniently be equipped with a drain pipe 20 and overflow pipe 21.

The other compartment 13 is adapted to accommodate a viscosimeter indicated generally at 22, preferably as shown in Figs. 2 and 3, and which will also be described more fully hereinafter. The viscosimeter can, however, be so located, as, for example, by angle brackets 23, 23, that it can be completely immersed by a bath which substantially completely fills this compartment.

At a point where the pipe line 12 communicates with this compartment and discharges its cooling fluid, there is located in the path of the discharge impellers 24, 24, the shaft of which passes through a snugly fitted insulated cover 25 of the tank 10. The impellers may be actuated in a convenient manner, and preferably rotate at a speed which produces a low lag in attainment of thermal equilibrium, for example, about 450 R. P. M.

Also located in submerged position there may be utilized a rotator 26 carrying any desired number of stoppered viscosity tubes, the contents of which it is desired to condition, as to the proper degree of temperature, while awaiting test. This rotator may be operated by any suitable means, e. g. by a shaft extending through the compartment wall geared to a power unit (not shown). The tubes are thus rotated end over end so that local inequalities of temperature during the attainment of thermal equilibrium is avoided. The compartment is also equipped with an overflow pipe 27 and drain pipe 28.

Immersibly located in the tank 10 is a thermo-regulator 29 of low lag capacity. This is preferably a glass tube having a large surface to volume ratio and containing a temperature sensitive medium such as toluene or the like. The regulator is secured to one end of the tank preferably near the top and has a narrow neck 30 through which is permitted to rise and fall against a spindle 31 of light weight material an impulse producing medium, e. g. mercury. This in turn forms part of an electric circuit connected to a source of energy of about 110 volts A. C. through an electronic vacuum tube relay 32 and only a small current at low voltage is permitted to flow to the thermo-regulator. Connected with the relay is the solenoid 17 which operates the valve 18.

Referring more particularly to Fig. 2, the viscosimeter preferably is composed of a rectangular container 33 of suitable material having leveling elements 34, 34. This tank is partitioned, for example, with wire screens 35 to hold a number of viscosity tubes 36 containing the particular material whose viscosity it is sought to determine. These tubes should be of uniform inside diameter but may be of only casually matched outside diameter. A master element, for example a tube 37, which is not of uniform bore but large enough in inside diameter to receive the viscosity tubes, may be placed in the center of the rectangular container 33 and inclined at an angle of about 15 degrees to the vertical. This master tube carries etched markings 38, 38 near the top and bottom, but it may have a series of markings 39, 39 at simple fractions of one-half, one-quarter, etc., of the total distance between the extreme graduations. This will permit more than one reading to be obtained during one test on a single sample and increase the range of viscosities which may be determined in a reasonable time. These readings may be taken through a conveniently located double walled glass window 40 located on the side wall of the compartment 13 of the receptacle 10.

In operation, tap water flows through the pipe 14 and into compartment 11 through cooling coils 12, and in an amount sufficient to fill the conditioning chamber or compartment 13. The viscosimeter, after the desired temperature of the conditioning medium has been reached, is placed in leveled position on the supports 23. In addition, other tubes ready for test may be placed in the viscosity tube rotator 26. When the contents of the viscosity tubes have reached the proper temperature they are placed in the master tube 37 and their viscosities measured by the time required for a body, e. g. a sphere placed in the viscosity tube to rise or fall therein past any of the calibrations chosen on the master tube as observed through the window 40. During the period that the tubes are immersed in the conditioning medium and while the measurements are being made the temperature of the conditioning medium should be maintained substantially constant. This is attained by means of the thermo-regulator which closes and breaks the circuit through the vacuum electronic relay in accordance with changes in temperature of the conditioning medium, thereby controlling the vacuum tube relay 32 which in turn operates solenoid 17 and valve 18. The stream of tap water is thus either directed into the waste drain 16 or again through the cooling coils 12 in accordance with the temperature changes.

The advantages attendant upon the present invention are that, a large number of readings may be taken in a short space of time; the viscosity tubes may be removed and cleaned with great facility; the same graduation marks may be used with every tube, thus possible errors in calibration between the tubes are minimized; the expense of an apparatus with large capacity is greatly reduced; and the viscosimeter may easily be completely immersed in a thermostat. A further advantage is the attainment of thermostatic control to within .001° centigrade, which is facilitated by adequate insulation; by discharge of hot or cold water, or other suitable temperature conditioning medium directly into the viscosimeter compartment between stirring impellers, and by a sensitive thermo-regulator containing toluene.

In the specification and claims the term "viscosity" is used in the sense of apparent or structural viscosity. The apparatus is suitable for use in connection with the making of plastic measurements or measurements in which plasticity or elasticity may play a part. For example, it may be used in making determinations of gels such as gelatin, or gluten, etc. In the case of gelatin the solution prior to the beginning of gelation exhibits a true viscosity. After gelation begins the solution exhibits plastic and elastic as well as viscous properties and as gelation progresses the apparent viscosity gradually decreases.

It will thus be seen that the objects and advantages hereinabove set forth may be readily and efficiently attained and since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent, is:

1. An apparatus for measuring viscosity of materials comprising, in combination, a viscosimeter of the sphere type including a series of matched viscosity tubes and a calibrated master tube adapted selectively to receive said tubes, a receptacle containing a heat transmitting medium, said tubes being immersed in said medium to condition contents thereof prior to and during measurement, and means associated with said receptacle to maintain the temperature of said medium constant.

2. In an apparatus for measuring viscosity of materials the improvement which comprises, in combination, a calibrated transparent master tube and at least two matched transparent viscosity tubes adapted to be sleeved into said master tube, each of said viscosity tubes utilizing the master tube calibrations when viscosity is measured.

3. In an apparatus for measuring viscosity of materials the improvement which comprises, in combination, a calibrated transparent master tube, a plurality of transparent viscosity tubes of uniformly matched inside diameters adapted to be sleeved into said master tube, and a falling sphere, each of said viscosity tubes utilizing the master tube calibrations when viscosity is measured, whereby a rapid multiple testing is effected.

QUICK LANDIS.